(12) United States Patent
Cooper

(10) Patent No.: US 10,962,160 B2
(45) Date of Patent: Mar. 30, 2021

(54) CAMLOCK

(71) Applicant: Gall Thomson Environmental Limited, Norfolk (GB)

(72) Inventor: Neil Cooper, Norfolk (GB)

(73) Assignee: GALL THOMSON ENVIRONMENTAL LIMITED, Norfolk (GB)

( * ) Notice: Subject to any disclaimer, the term of this patent is extended or adjusted under 35 U.S.C. 154(b) by 278 days.

(21) Appl. No.: 16/092,441

(22) PCT Filed: Apr. 6, 2017

(86) PCT No.: PCT/GB2017/050967
§ 371 (c)(1),
(2) Date: Oct. 9, 2018

(87) PCT Pub. No.: WO2017/178798
PCT Pub. Date: Oct. 19, 2017

(65) Prior Publication Data
US 2019/0107235 A1 Apr. 11, 2019

(30) Foreign Application Priority Data
Apr. 11, 2016 (GB) .................................. 1606073

(51) Int. Cl.
*F16L 23/02* (2006.01)
*F16L 37/18* (2006.01)
(Continued)

(52) U.S. Cl.
CPC .............. *F16L 37/18* (2013.01); *F16L 23/003* (2013.01); *F16L 23/036* (2013.01)

(58) Field of Classification Search
CPC .............................. F16L 23/02; F16L 23/036
(Continued)

(56) References Cited

U.S. PATENT DOCUMENTS 554,666 A * 2/1896 Feltner .................. F16L 37/252
285/85
643,358 A * 2/1900 Konold ................. F16L 37/252
285/85
(Continued)

FOREIGN PATENT DOCUMENTS

EP        0773398 A1 *  5/1997  ............ F16L 23/036
GB        0 842 542 A      7/1960
(Continued)

OTHER PUBLICATIONS

International Search Report and Written Opinion, PCT/GB2017/050967, Gall Thomson Environmental Limited, 8 pages (dated Jun. 30, 2017).
(Continued)

*Primary Examiner* — David Bochna
(74) *Attorney, Agent, or Firm* — Foley & Lardner LLP

(57) ABSTRACT

A camlock is for use in a flange assembly. The camlock comprises:
a cam member for engaging a flange, the cam member arranged to be rotatable about its rotational axis; and
a ratchet mechanism including first and second ratchet members, the first and second ratchet members arranged in a mutual engagement to permit relative movement between the first and second ratchet members in one direction and limit relative movement between the first and second ratchet members in the opposite direction, wherein the cam member and the ratchet mechanism are arranged so that the mutual engagement between the first and second ratchet members-permits rotation of the cam member about its rotational axis in one direction and limits rotation of the cam member about its rotational axis in the opposite direction.

15 Claims, 6 Drawing Sheets

US 10,962,160 B2
Page 2

(51) Int. Cl.
*F16L 23/00* (2006.01)
*F16L 23/036* (2006.01)

(58) Field of Classification Search
USPC .................................. 285/406, 412, 92, 920
See application file for complete search history.

(56) References Cited

U.S. PATENT DOCUMENTS

| | | | | |
|---|---|---|---|---|
| 903,435 | A * | 11/1908 | Barrott | E21B 17/043 285/82 |
| 1,576,698 | A * | 3/1926 | Williams | F16L 37/252 285/85 |
| 2,996,318 | A * | 8/1961 | Gravert | E05B 75/00 285/358 |
| 3,026,128 | A * | 3/1962 | Willis | F16L 23/04 285/406 |
| 3,368,602 | A * | 2/1968 | Boyd | F16B 39/24 411/105 |
| 3,830,533 | A * | 8/1974 | Mezei | B67D 9/02 285/364 |
| 3,971,575 | A * | 7/1976 | Lesham | G21C 3/334 285/85 |
| 4,106,541 | A * | 8/1978 | Gravert | F16L 37/18 285/84 |
| 4,113,227 | A * | 9/1978 | Cigliano | F16L 37/18 285/84 |
| 4,183,189 | A * | 1/1980 | Keller | E02B 17/0004 285/406 |
| 4,198,076 | A * | 4/1980 | Mezei | F16L 37/12 285/18 |
| 4,655,482 | A * | 4/1987 | Myers | F16L 19/005 285/305 |
| 5,074,703 | A * | 12/1991 | Dawson | G05G 5/12 403/342 |
| 10,473,132 | B2 * | 11/2019 | Westgarth | F16L 15/08 |

FOREIGN PATENT DOCUMENTS

| | | | |
|---|---|---|---|
| GB | 1 401 582 A | 7/1975 | |
| GB | 1 579 150 A | 11/1980 | |
| GB | 1 599 253 A | 9/1981 | |
| JP | 2009-228769 A | 10/2009 | |
| WO | WO-2006/067084 A1 | 6/2006 | |
| WO | WO-2013117911 A1 * | 8/2013 | ............ F16B 31/043 |

OTHER PUBLICATIONS

Gall Thomson brochure "Welin Camlock Couplings", Mar. 24, 2014, retrieved by https://www.gall-thomson.co.uk/launch-of-camlock-coupling-brochure/.

* cited by examiner

CAMLOCK

CROSS-REFERENCE TO RELATED APPLICATIONS

This application is a U.S. National Stage Application of PCT/GB2017/050967, filed Apr. 6, 2017, which claims the benefit of and priority to Great Britain Patent Application No. 1606073.3, filed Apr. 11, 2016, both of which are incorporated herein by reference in their entireties.

BACKGROUND

This invention relates to a camlock for use in a flange assembly, and to a flange assembly, preferably for use in the creation of a connection between a pair of pipes or hoses.

A camlock is conventionally used to secure flanges together in a flange assembly, and is also known by other names such as cam lever, camlock coupling, and camlock fitting.

SUMMARY

According to a first aspect of the invention, there is provided a camlock for use in a flange assembly, the camlock comprising:
  a cam member for engaging a flange, the cam member arranged to be rotatable about its rotational axis; and
  a ratchet mechanism including first and second ratchet members, the first and second ratchet members arranged in a mutual engagement to permit relative movement between the first and second ratchet members in one direction and limit relative movement between the first and second ratchet members in the opposite direction, wherein the cam member and the ratchet mechanism are arranged so that the mutual engagement between the first and second ratchet members permits rotation of the cam member about its rotational axis in one direction and limits rotation of the cam member about its rotational axis in the opposite direction.

The inclusion of a ratchet mechanism in the camlock of the invention provides the camlock with a mechanical locking mechanism capable of applying a mechanical locking force at one or more engagement points between the first and second ratchet members in order to securely lock the position of the cam member about its rotational axis.

In addition the ratchet mechanism may be designed so that the first and second ratchet members are capable of engaging each other at different positions to provide the cam member with different locking positions about its rotational axis. A camlock with a cam member having different locking positions about its rotational axis is advantageous in that it can be used for a range of products, e.g. a range of flange assemblies, without requiring a substantial redesign of the camlock.

The inclusion of the ratchet mechanism in the camlock of the invention further permits tightening of the cam member about its rotational axis without requiring any disengagement between the first and second ratchet members. This prevents accidental release of the cam member during the tightening process. Such tightening of the cam member can be carried out by hand or using a locking bar or wrench.

Furthermore the ratchet mechanism may be designed such that the relative movement between the first and second ratchet members to move the cam member to a new locking position creates audible feedback (such as a click sound) and/or tactile feedback (such as mechanical resistance) that can be sensed by a user, which in turn has the effect of reassuring the user that the camlock is working as intended.

It will be appreciated that the configuration of the first and second ratchet members in the ratchet mechanism may vary so long as they are arranged in a mutual engagement to permit relative movement between the first and second ratchet members in one direction and limit relative movement between the first and second ratchet members in the opposite direction, and the mutual engagement between the first and second ratchet members permits rotation of the cam member about its rotational axis in one direction and limits rotation of the cam member about its rotational axis in the opposite direction.

In embodiments of the invention, the first and second ratchet members may be arranged in a mutual engagement to permit relative rotation between the first and second ratchet members in one direction and limit relative rotation between the first and second ratchet members in the opposite direction. Such an arrangement of the first and second ratchet members makes it easier to design the ratchet mechanism to be compatible with the rotational movement of the cam member.

In such embodiments, the cam member and the ratchet mechanism may be arranged so that: one of the first and second ratchet members is permitted to rotate relative to the cam member; and the other of the first and second ratchet members is inhibited from rotating relative to the cam member. Such an arrangement of the cam member and the ratchet mechanism ensures that the mutual engagement between the first and second ratchet members permits rotation of the cam member about its rotational axis in one direction and limits rotation of the cam member about its rotational axis in the opposite direction.

In further embodiments of the invention, at least one of the first and second ratchet members may include a toothed ring that includes: a ring body; and a plurality of teeth circumferentially arranged about the ring body, each tooth having an asymmetrical tooth profile. In a preferred embodiment of the invention, each of the first and second ratchet members may include a toothed ring that includes: a ring body; and a plurality of teeth circumferentially arranged about the ring body, each tooth having an asymmetrical tooth profile, and wherein the plurality of teeth of the toothed rings of the first and second ratchet members may be arranged in a mutual engagement.

The asymmetrical tooth profile of each tooth is shaped to permit relative movement between the first and second ratchet members in one direction and limit relative movement between the first and second ratchet members in the opposite direction. For example, a first edge of the asymmetrical tooth profile of a given tooth may be configured to have a gradual slope that permits the opposing ratchet member to readily slide over the first edge to pass the given tooth in one direction, while a second opposing edge of the asymmetrical tooth profile may be configured to have a steep slope that catches the opposing ratchet member to prevent it from sliding over the second edge to pass the given tooth in the other direction, thereby locking the opposing ratchet member against the given tooth.

The use of a toothed ring in either or both of the first and second ratchet members provides a reliable means of applying a mechanical locking force at multiple engagement points between the first and second ratchet members at any given time. This not only improves the reliability of the locking of the cam member about its rotational axis, but also permits the distribution of the mechanical locking force across the multiple engagement points to reduce stress and wear at each engagement point.

Moreover the use of a toothed ring in either or both of the first and second ratchet members results in the provision of multiple locking positions of the cam member about its rotational axis. The number of locking positions of the cam member about its rotational axis may vary depending on the number of teeth in the or each toothed ring.

The ratchet mechanism may be partly or wholly housed within the cam member. For example, at least one of the first and second ratchet members may be housed in a chamber within the cam member.

Housing the ratchet mechanism within the cam member in this manner not only results in a compact configuration of the camlock, but also permits the external shape of the camlock of the invention to visually resemble a conventional camlock. The latter readily permits tightening of the camlock by hand or using a conventional locking bar or wrench.

In addition housing the ratchet mechanism within the cam member permits the ratchet mechanism to be sealed within the cam member to prevent ingress of debris and/or water that could prevent it from working or damage the ratchet mechanism.

When one of the first and second ratchet members is permitted to rotate relative to the cam member and the other of the first and second ratchet members is inhibited from rotating relative to the cam member, the camlock may include a first fastener configured to fasten the other of the first and second ratchet members to a wall of the chamber. Such a fastener may be, for example, in the form of a countersunk screw.

In embodiments of the invention, the camlock may include a biasing member arranged to apply a biasing force to one of the first and second ratchet members such that the one of the first and second ratchet members engages the other of the first and second ratchet members. The application of the biasing force in this manner reduces the risk of uncontrolled disengagement of the first and second ratchet members, which in turn may lead to undesirable rotation of the cam member about its rotational axis.

In a preferred embodiment of the invention, the biasing member may be resilient. For example, the biasing member is a spring. The use of a resilient biasing member provides a ready means for reapplying the biasing force to reengage the first and second ratchet members in the event of disengagement of the first and second ratchet members (which may be controlled or uncontrolled).

In further embodiments of the invention, the camlock may further include an actuator configured to be operable to apply an actuating force to move one of the first and second ratchet members between first and second positions, wherein the one of the first and second ratchet members in the first position is engaged with the other of the first and second ratchet members and in the second position is disengaged from the other of the first and second ratchet members. Such an actuator permits controlled disengagement of the first and second ratchet members, which may be desirable in order to release the camlock from a given locking position.

In embodiments of the invention employing the use of the actuator and the biasing member, the actuator may be configured to be operable to apply an actuating force to oppose the biasing force when the one of the first and second ratchet members is moved from the first position to the second position. The configuration of the actuator in this manner permits disengagement of the first and second ratchet members in the presence of the biasing member, and automatic reengagement of the first and second ratchet members after the actuating force is removed.

The form and configuration of the actuator may differ depending on the design requirements of the camlock. For example, the actuator may be a button pushable to apply a pushing force to move the one of the first and second ratchet members between the first and second positions, thus providing a user with clear visual indication of whether the first and second ratchet members are engaged or disengaged.

The camlock employing the actuator may include a second fastener configured to secure the one of the first and second ratchet members to the actuator. The form and configuration of the second fastener may vary depending on the form and configuration of the one of the first and second ratchet members and on the form and configuration of the actuator.

For example, the second fastener may include a pin that is arranged to secure the one of the first and second ratchet members to the actuator. Such a second fastener may be used when the one of the first and second ratchet members includes a toothed ring with a ring body and the actuator includes a longitudinal member arranged to extend through an aperture of the ring body of the toothed ring.

According to a second aspect of the invention, there is provided a flange assembly comprising: a pair of flanges; and at least one camlock according to any one of the embodiments of the first aspect of the invention, the cam member of the or each camlock arranged to be rotatable about its rotational axis to engage at least one of the flanges so as to secure the flanges together.

The features and advantages of the camlock of the first aspect of the invention and its embodiments apply mutatis mutandis to the flange assembly of the second aspect of the invention.

BRIEF DESCRIPTION OF THE FIGURES

A preferred embodiment of the invention will now be described, by way of a non-limiting example, with reference to the accompanying drawings in which.

DETAILED DESCRIPTION

Figure 1:
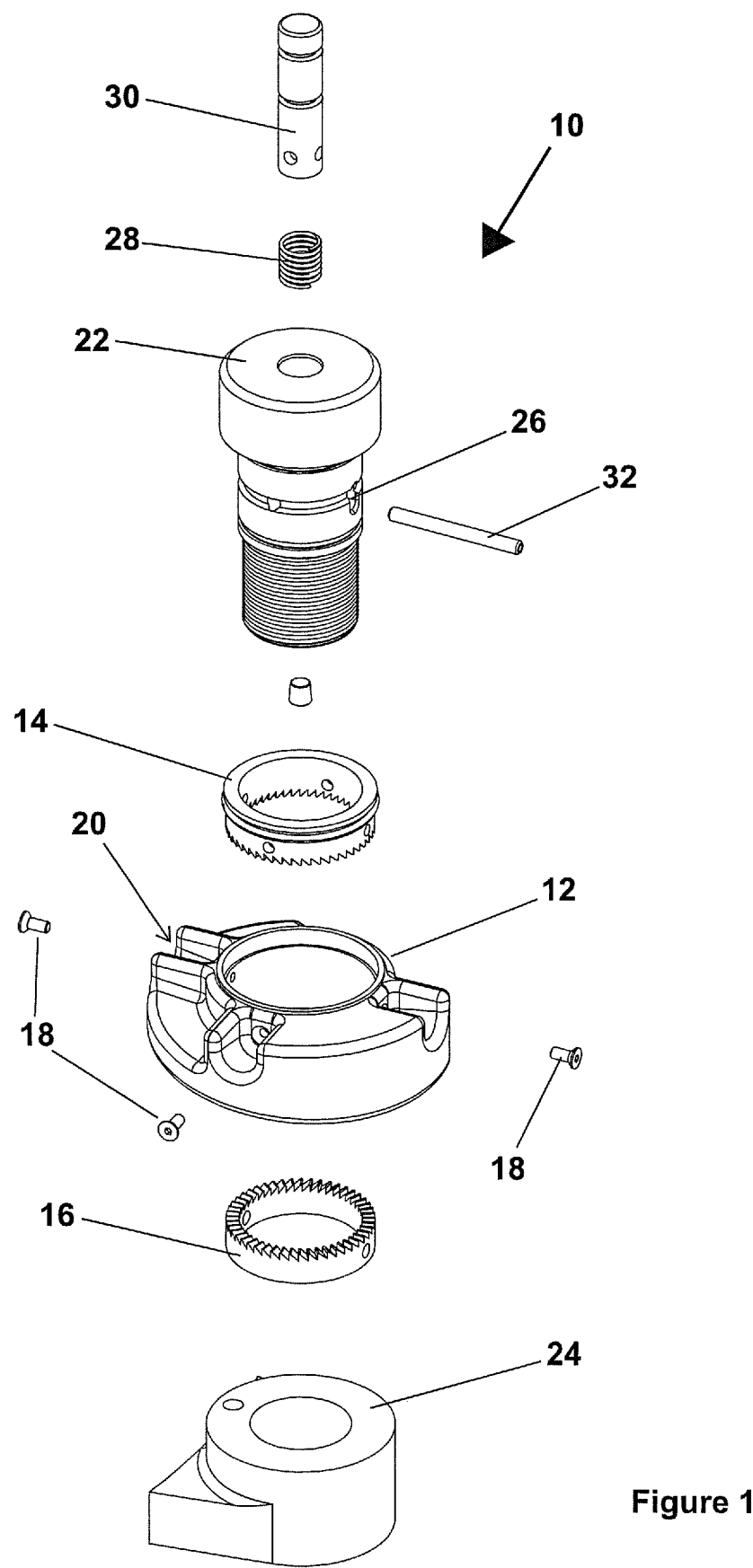
FIG. 1 shows schematically an exploded view of a camlock according to an embodiment of the invention.
Figure 2:
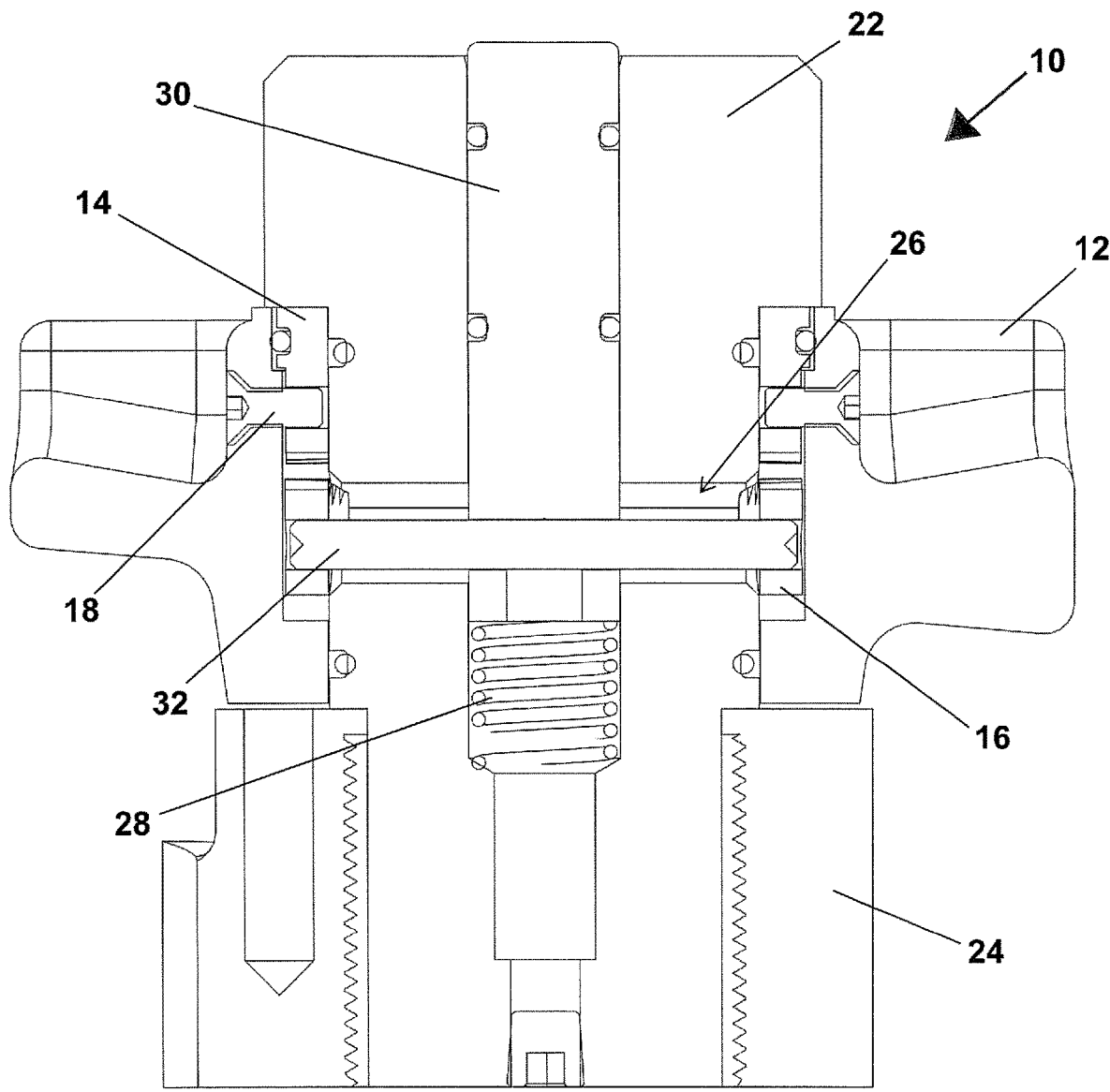
FIG. 2 shows schematically a cross-sectional view of the camlock of FIG. 1 in its assembled configuration.

A camlock according to an embodiment of the invention is shown in FIGS. 1 and 2, and is designated generally by the reference numeral 10.

The camlock 10 includes a cam member 12, which is arranged to be rotatable about its rotational axis. The camlock 10 also includes a ratchet mechanism that includes first and second ratchet members. The first ratchet member is in the form of a first toothed ring 14, while the second ratchet member is in the form of a second toothed ring 16. Each toothed ring 14, 16 includes: an annular ring body; and a plurality of teeth circumferentially spaced apart about the ring body.

Each tooth has an asymmetrical tooth profile, which is shaped to permit relative rotation between the first and second toothed rings 14, 16 in one direction and limit relative rotation between the first and second ratchet members in the opposite direction. In particular, a first edge of the asymmetrical tooth profile of a given tooth is configured to have a gradual slope that permits a tooth of the opposing toothed ring to readily slide over the first edge to pass over the given tooth in one direction, while a second opposing edge of the asymmetrical tooth profile is configured to have a steep slope that catches a tooth of the opposing toothed ring to prevent it from sliding over the second edge to pass over the given tooth in the other direction, thereby locking the opposing toothed ring against the given tooth.

The toothed rings 14, 16 are housed in a bore that is formed within and extends through the cam member 12. Housing the toothed rings 14, 16 in the bore of the cam member 12 not only provides a compact configuration of the camlock 10, but also allows the exterior of the camlock 10 of FIG. 2 to visually resemble a conventional camlock 10. The toothed rings 14, 16 are positioned inside the bore such that the tubular axes of the ring bodies of the first and second toothed rings 14, 16 are arranged to be coaxial with the rotational axis of the cam member 12, so that each toothed ring 14, 16 can be rotated about the same rotational axis as the cam member 12.

The first toothed ring 14 is located towards a first end of the bore and is fastened to a wall of the bore using countersunk screws 18, which are fitted through respective slots 20 formed on the exterior of the cam member 12. Such slots 20 are designed to be engaged by a locking bar. In this manner the first toothed ring 14 is inhibited from rotating relative to the cam member 12, i.e. the first toothed ring 14 rotates together with the cam member 12.

The second toothed ring 16 is located towards the middle of the bore between the first and second ends of the bore, and is permitted to rotate freely relative to the cam member 12 while being housed in the bore.

The camlock 10 further includes a shoulder bolt 22 arranged to be coaxial with the tubular axes of the toothed rings 14, 16 so that the shoulder bolt 22 extends through the bore and through the ring bodies of the toothed rings 14, 16. The shoulder bolt 22 is extended through the bore is such that its threaded end is located outside the bore and extends away from the second end of the bore. In use, the threaded end of the shoulder bolt 22 is securable to a base 24.

The shoulder bolt 22 is dimensioned to allow a sealing fit to be formed via a first O-ring seal positioned between the shoulder bolt 22 and the first toothed ring 14. A second O-ring seal is positioned between the first toothed ring 14 and the wall of the bore, while a third O-ring seal is positioned between the shoulder bolt 22 and the wall of the bore towards the second end of the bore. The seals act to prevent ingress of debris and water into the bore.

A longitudinal slot 26 is arranged to extend diametrically through a portion of the shoulder bolt 22 located inside the bore, and is aligned with the second toothed ring 16. The slot is shaped to provide space between the shoulder bolt 22 and the second toothed ring 16 so that the shoulder bolt 22 does not interfere with the movement of the second toothed ring 16.

The camlock 10 includes a spring member 28 and a release button 30 arranged inside an internal chamber of the shoulder bolt 22, where a tubular axis of the internal chamber is coaxial with the tubular axes of the toothed rings 14, 16. In particular, the spring member 28 is located inside the internal chamber towards the second end of the bore, while the release button 30 is located inside the internal chamber towards the first end of the bore.

The internal chamber and release button 30 are dimensioned to permit the sliding movement of the release button 30 within the internal chamber. Further seals are positioned between the release button 30 and the walls of the internal chamber. In the embodiment shown, the spring member 28 is in the form of a helical spring member 28 that is partially compressed within the internal chamber and is arranged to apply a biasing force that acts to push the release button 30 away from the second end of the bore and towards the first end of the bore. It is envisaged that, in other embodiments of the invention, the spring member 28 may be replaced by another type of resilient member capable of applying a biasing force against the release button 30.

The internal chamber extends through the shoulder bolt 22 such that it overlaps with the longitudinal slot 26, and part of the release button 30 is arranged to extend into the longitudinal slot 26. A cross pin 32 is arranged to extend diametrically through the ring body of the second toothed ring 16, through the longitudinal slot 26 of the shoulder bolt 22, and through a cross hole in the portion of the release button 30 that extends into the longitudinal slot 26. This allows the second toothed ring 16 to be mechanically coupled to the release button 30 via the cross pin 32.

Figure 3:
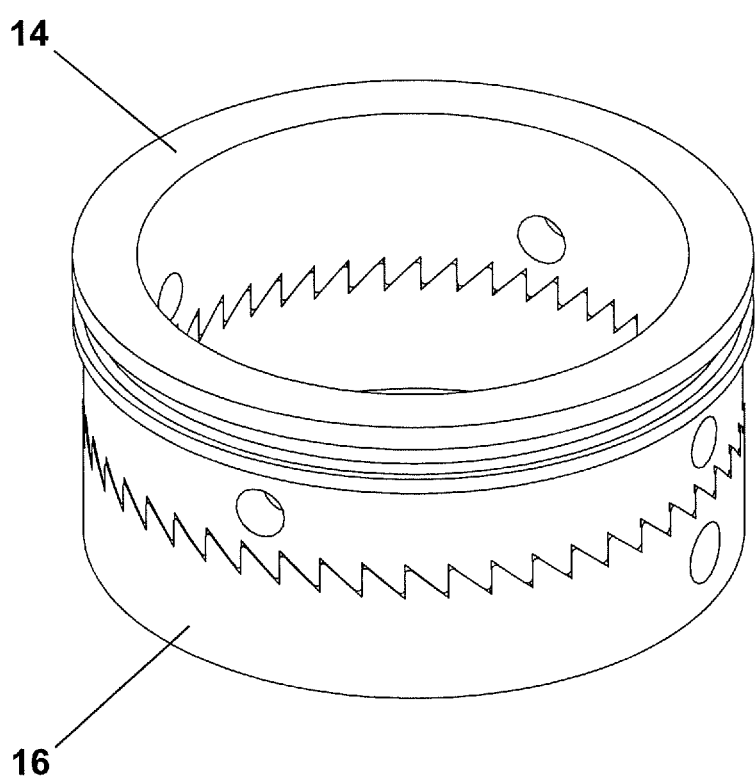
FIGS. 3 and 4 respectively show a pair of toothed rings when they are mutually engaged and when they are disengaged.

The mechanical coupling between the second toothed ring 16 and the release button 30 not only results in the spring member 28 maintaining its partially compressed state, but also results in the partially compressed spring member 28 applying the biasing force to push the second toothed ring 16 away from the second end of the bore and towards the first end of the bore. This in turn causes the teeth of the second toothed ring 16 to engage the teeth of the first toothed ring 14, thus resulting in a mutual engagement of the toothed rings 14, 16, as shown in FIG. 3.

For the purposes of illustrating how the invention works, the clockwise direction is designated as the direction in which relative rotation between the first and second toothed rings 14, 16 is permitted, while the counter-clockwise direction is designated as the direction in which relative rotation between the first and second toothed rings 14, 16 is limited.

When the camlock 10 is in a state of rest, the teeth of the toothed rings 14, 16 are mutually engaged such that each tooth of each toothed ring 14, 16 is located inside a respective one of the gaps between the teeth of the opposing toothed ring. Such mutual engagement between the teeth of the toothed rings 14, 16 results in the provision of multiple engagement points between the toothed rings 14, 16. The biasing force applied by the spring member 28 to mutually engage the toothed rings 14, 16 ensures that the cam member 12 is prevented from rotating in the clockwise direction in the absence of a sufficiently large rotating force to the cam member 12. The cam member 12 is also prevented from rotating in the counter-clockwise direction due to the asymmetrical tooth profiles of the teeth of the toothed rings 14, 16.

In this manner the ratchet mechanism acts as a mechanical locking mechanism that applies a mechanical locking force across the teeth of the toothed rings 14, 16 in order to lock the position of the cam member 12 about its rotational axis. This not only improves the reliability of the locking of the cam member 12 about its rotational axis, but also permits the distribution of the mechanical locking force across the multiple engagement points between the toothed rings 14, 16 to reduce stress and wear at each engagement point.

In order to rotate the cam member 12, an external clockwise rotating force is applied to the cam member 12 either by hand or using a locking bar or wrench. The application of the rotating force to the cam member 12 causes the first toothed ring 14 to rotate together with the cam member 12 and thereby causes the first toothed ring 14 to rotate in a clockwise direction relative to the second toothed ring 16. During the relative rotation of the toothed rings 14, 16, each tooth of the first toothed ring 14 rides up and over the profile of the corresponding tooth of the second toothed ring 16, which forces the second toothed ring 16 to move away from the first toothed ring 14 while still remaining in contact with the first toothed ring 14. Such movement of the second toothed ring 16 is made possible by the partially compressed state of the spring member 28.

After each tooth of the first toothed ring 14 passes over the corresponding tooth of the second toothed ring 16 rides, the biasing force applied by the spring member 28 to the second toothed ring 16 pushes the teeth of the second toothed ring 16 into the gaps between the teeth of the first toothed ring 14, thus pushing the second toothed ring 16 back towards the first toothed ring 14. At the same time the teeth of the first toothed ring 14 is also forced into the gaps between the teeth of the second toothed ring 16.

Hence the spring member 28 allows the toothed rings 14, 16 to be rotated relative to each other in order to rotate the cam member 12 while keeping the toothed rings 14, 16 in contact with each other at all times.

Any attempt to rotate the cam member 12 in the counter-clockwise direction will cause the steep edges of the asymmetrical tooth profiles of the teeth of the toothed rings 14, 16 to bear against each other, thus preventing the teeth of the toothed rings 14, 16 from passing each other.

The above arrangement of the cam member 12 and the ratchet mechanism ensures that the mutual engagement between the first and second toothed rings 14, 16 permits rotation of the cam member 12 about its rotational axis in one direction and limits rotation of the cam member 12 about its rotational axis in the opposite direction. Hence, the camlock 10 can be securely locked in position without running the risk of being accidentally rotated in the reverse counter-clockwise direction.

Figure 5:
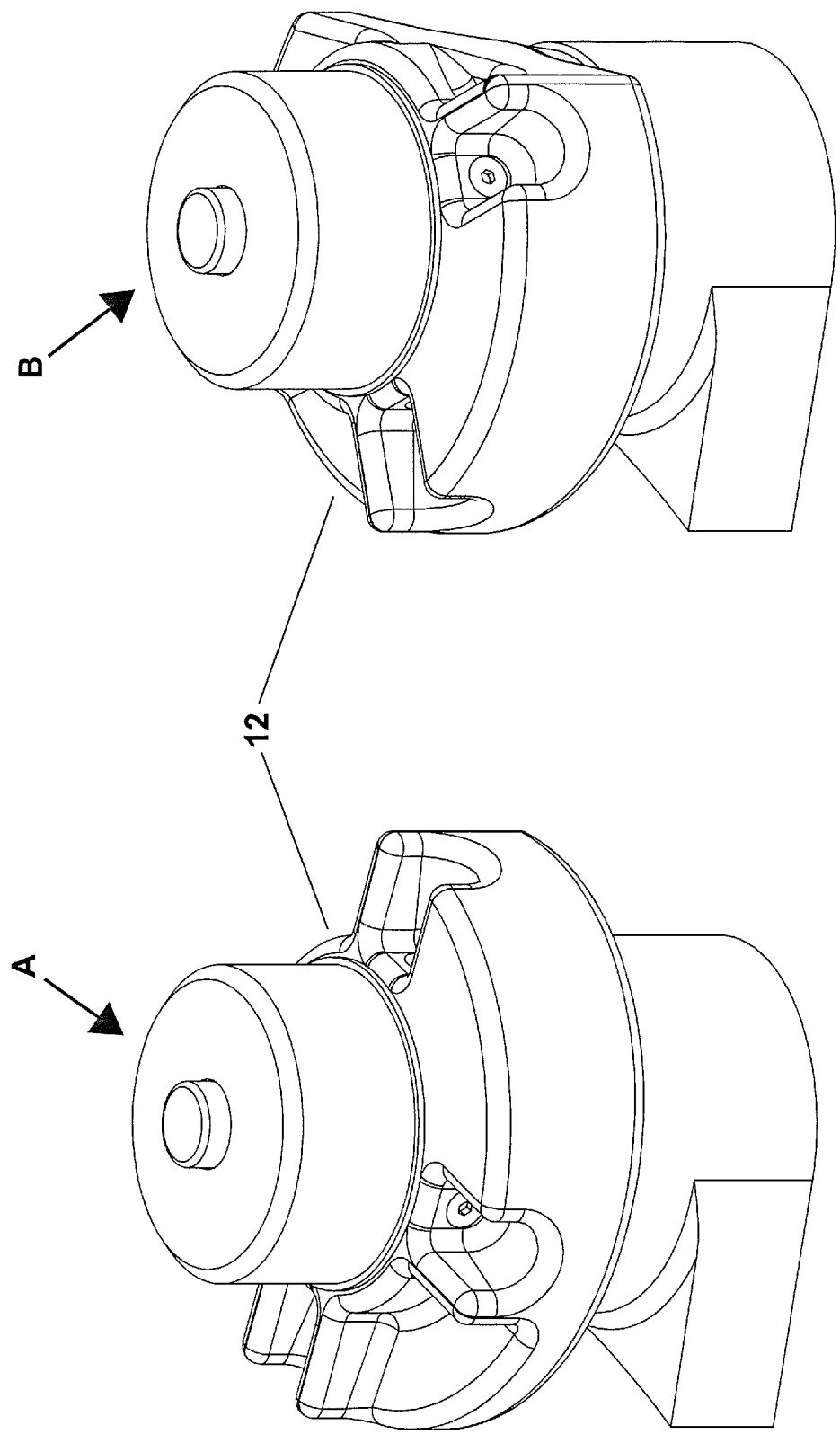
FIG. 5 shows the camlock of FIGS. 1 and 2 in different locking positions.

Moreover the use of toothed rings 14, 16 as the first and second ratchet members in the ratchet mechanism provides the cam member 12 with multiple locking positions about its rotational axis. Examples of different locking positions A, B of the cam member 12 are shown in FIG. 5. This is because the first and second toothed rings 14, 16 are capable of engaging each other at different rotational positions. The number of locking positions of the cam member 12 about its rotational axis varies depending on the number of teeth in the toothed rings 14, 16. For example, if each toothed ring 14, 16 each has 48 teeth, the cam member 12 has a locking position every 7.5° about its rotational axis.

The relative movement between the first and second toothed rings 14, 16 to move the cam member 12 to a new locking position beneficially creates audible feedback (such as a click sound) due to the teeth of each toothed ring 14, 16 into the gaps between the teeth of the opposing toothed ring after rotation of the cam member 12, and tactile feedback in the form of mechanical resistance due to the teeth riding past each other. Such feedback can be sensed by a user, which in turn has the effect of reassuring the user that the camlock 10 is working as intended.

Figure 4:
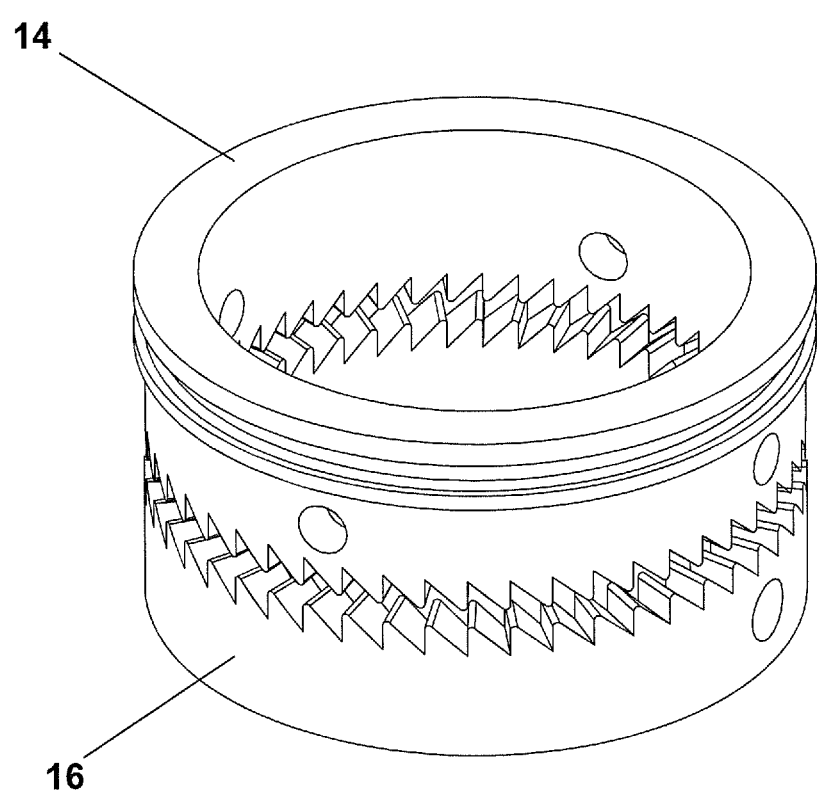

The camlock 10 can be rotated in the counter-clockwise direction by releasing the ratchet mechanism. In order to release the ratchet mechanism, the release button 30 needs to be manually depressed, which results in the application of a pushing force to oppose the biasing force. When the pushing force is sufficiently large to overcome the biasing force, the pushing force can move the second toothed ring 16 from a first position (in which it is engaged with the first toothed ring 14 as shown in FIG. 3) to a second position (in which it is disengaged from the first toothed ring 14 as shown in FIG. 4). The disengagement between the first and second toothed rings 14, 16 in turned permits free rotation of the cam member 12 about its rotational axis. Thereafter, when the release button 30 is undepressed, the second toothed ring 16 will automatically reengage the first toothed ring 14 as a result of the spring member 28 applying the biasing force to the second toothed ring 16.

The provision of the release button 30 not only permits manual intervention from a user to release the ratchet mechanism and thereby permit free rotation of the cam member 12 in the reverse counter-clockwise direction, but also provides visual indication of whether the toothed rings 14, 16 are engaged or disengaged.

It will be appreciated that, in other embodiments of the invention, the counter-clockwise direction may be designated as the direction in which relative rotation between the first and second toothed rings 14, 16 is permitted, while the clockwise direction is designated as the direction in which relative rotation between the first and second toothed rings 14, 16 is limited.

Figure 6:
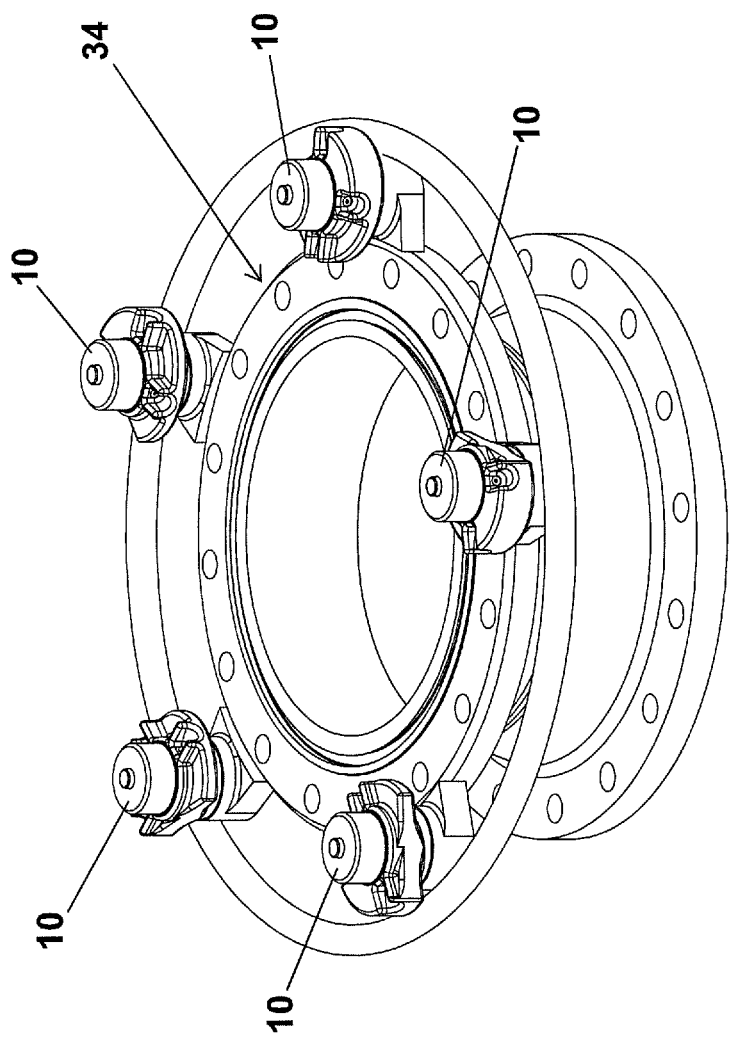
FIG. 6 shows a plurality of camlocks mounted onto a flange.

The camlock 10 of FIGS. 1 and 2 is particularly advantageous in use in a flange assembly to engage at least one of the flanges of the flange assembly so as to secure the flanges together. In particular, the camlock 10 may be arranged in the flange assembly so as to enable the cam member 12 to be rotated about its rotational axis to a locking position through use of the ratchet mechanism when it is required to secure the flanges together, and rotated about its rotational axis through release of the ratchet mechanism when it is required to separate the flanges. FIG. 6 shows a plurality of camlocks 10 mounted onto a flange 34. Each cam member 12 of each camlock 10 is rotatable about its rotational axis to selectively secure another flange (not shown) to the flange 34 or separate the other flange from the flange 34.

It will be appreciated that the configuration of the first and second ratchet members are not limited to the toothed rings 14, 16 of the camlock 10 of FIGS. 1 and 2, and may vary so long as they are arranged in a mutual engagement to permit relative movement between the first and second ratchet members in one direction and limit relative movement between the first and second ratchet members in the opposite direction, and the mutual engagement between the first and second ratchet members permits rotation of the cam member 12 about its rotational axis in one direction and limits rotation of the cam member 12 about its rotational axis in the opposite direction.

It will also be appreciated that the camlock 10 may include a plurality of cam members 12 together with a plurality of ratchet mechanisms, each of which corresponds to a respective one of the cam members 12.

The invention claimed is:

1. A camlock for use in a flange assembly, the camlock comprising:
   a cam member for engaging a flange, the cam member arranged to be rotatable about its rotational axis; and
   a ratchet mechanism including first and second ratchet members, the first and second ratchet members arranged in a mutual engagement to permit relative movement between the first and second ratchet members in one direction and limit relative movement between the first and second ratchet members in the opposite direction, wherein the cam member and the ratchet mechanism are arranged so that the mutual engagement between the first and second ratchet members permits rotation of the cam member about its rotational axis in one direction and limits rotation of the cam member about its rotational axis in the opposite direction,
wherein each of the first and second ratchet members includes a toothed ring that includes: a ring body; and a plurality of teeth circumferentially arranged about the ring body, each tooth having an asymmetrical tooth profile, and wherein the plurality of teeth of the toothed rings of the first and second ratchet members are arranged in a mutual engagement.

2. A camlock according to claim 1 wherein the first and second ratchet members are arranged in a mutual engagement to permit relative rotation between the first and second ratchet members in one direction and limit relative rotation between the first and second ratchet members in the opposite direction.

3. A camlock according to claim 2 wherein the cam member and the ratchet mechanism are arranged so that: one of the first and second ratchet members is permitted to rotate relative to the cam member; and the other of the first and second ratchet members is inhibited from rotating relative to the cam member.

4. A camlock according to claim 3 wherein the ratchet mechanism is at least partly housed within the cam member, and at least one of the first and second ratchet members is housed in a chamber within the cam member, and wherein the camlock further includes a first fastener configured to fasten the other of the first and second ratchet members to a wall of the chamber.

5. A camlock according to claim 1 wherein the ratchet mechanism is partly or wholly housed within the cam member.

6. A camlock according to claim 5 wherein at least one of the first and second ratchet members is housed in a chamber within the cam member.

7. A camlock according to claim 1 including a biasing member arranged to apply a biasing force to one of the first and second ratchet members such that the one of the first and second ratchet members engages the other of the first and second ratchet members.

8. A camlock according to claim 7 wherein the biasing member is resilient.

9. A camlock according to claim 8 wherein the biasing member is a spring.

10. A camlock according to claim 1 further including an actuator configured to be operable to apply an actuating force to move one of the first and second ratchet members between first and second positions, wherein the one of the first and second ratchet members in the first position is engaged with the other of the first and second ratchet members and in the second position is disengaged from the other of the first and second ratchet members.

11. A camlock according to claim 10 further including a biasing member arranged to apply a biasing force to one of the first and second ratchet members such that the one of the first and second ratchet members engages the other of the first and second ratchet member, wherein the actuator is configured to be operable to apply an actuating force to oppose the biasing force when the one of the first and second ratchet members is moved from the first position to the second position.

12. A camlock according to claim 10 wherein the actuator is a button pushable to apply a pushing force to move the one of the first and second ratchet members between the first and second positions.

13. A camlock according to claim 10 including a second fastener configured to secure the one of the first and second ratchet members to the actuator.

14. A camlock according to claim 13 wherein the second fastener includes a pin that is arranged to secure the one of the first and second ratchet members to the actuator.

15. A flange assembly comprising: a pair of flanges; and at least one camlock according to claim 1, the cam member of the or each camlock arranged to be rotatable about its rotational axis to engage at least one of the flanges so as to secure the flanges together.

* * * * *